Feb. 26, 1957    W. J. CASEY III    2,782,874
HAND BRAKE
Filed Oct. 25, 1950

INVENTOR.
William J. Casey, III.
BY
Atty.

_United States Patent Office_ 2,782,874
Patented Feb. 26, 1957

2,782,874

HAND BRAKE

William J. Casey III, Chicago, Ill., assignor to American Steel Foundries, Chicago, Ill., a corporation of New Jersey Application October 25, 1950, Serial No. 192,101

7 Claims. (Cl. 188—59)

This invention relates to railway brake equipment and more particularly to a type commonly known as off wheel or rotor brakes.

The general object of the invention is to provide a novel hand brake assembly which may be readily incorporated in existing off wheel brake equipment.

Another object of the invention is to provide a novel inexpensive hand brake arrangement of rugged construction and such as will perform efficiently in service.

A more specific object of the invention is to provide a hand brake arrangement wherein force application through the hand brake is substantially equally distributed to the stators at opposite sides of a brake rotor irrespective of the extent of wear of one stator with regard to the other.

The invention contemplates a novel equalizing arrangement for distributing the pressures under substantially equal force to all of the associated stators.

These and other objects of the invention will become more apparent from the specification and the drawings, wherein.

Figure 1:
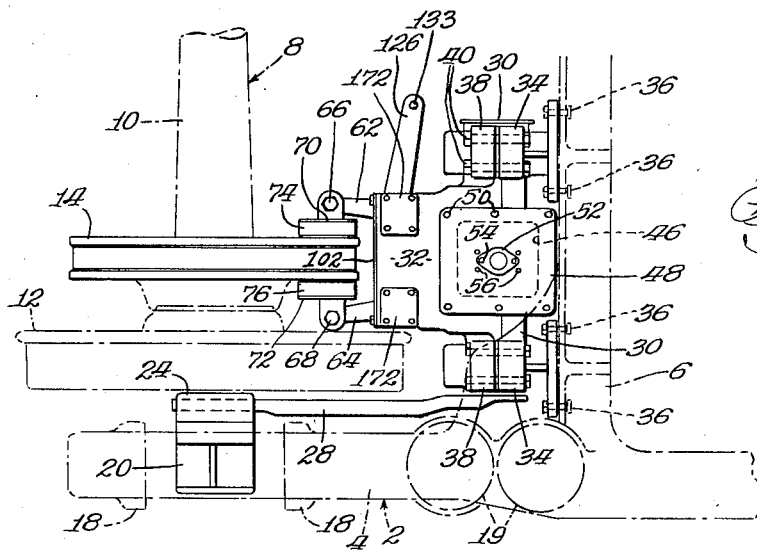
Figure 1 is a fragmentary plan view, showing approximately one quarter of a railway car truck with the novel disk brake mechanism applied thereto.
Figure 4:
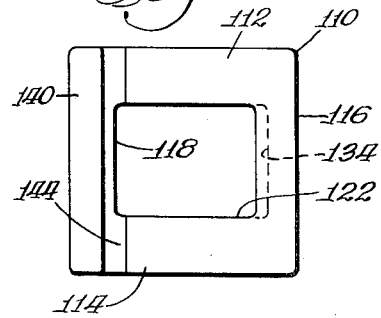
Figure 4 is a side elevational view of the novel link equalizer.

Describing the invention in detail and referring first to the general assembly view of Figure 1, the novel brake mechanism is illustrated as applied to a truck frame structure, generally indicated 2 and shown in dotted and dash lines in Figure 1, said structure including a frame having a side rail 4 at each side thereof and a transom 6 interconnecting the side rails 4 adjacent a wheel and axle assembly, generally indicated 8, and including an axle 10, a wheel 12, and a brake disk 14, secured to the wheel for rotation therewith in any convenient manner as by screws or studs (not shown) as will be readily understood by those skilled in the art.

Each side rail 4 is provided at each end thereof with a pair of depending pedestals or legs 18, 18 adapted to embrace an associated journal box (not shown) which affords support for an equalizer seat 20 supporting an end of a conventional equalizer (not shown), said equalizer being adapted to afford spring support in the conventional manner through springs 19, 19 for the frame 2, as will be readily understood by those skilled in the art.

The inboard side of the equalizer seat is provided with a bracket 24 which may confine the outer end of a torque arm 28 and have a flexible connection therewith. The inner end of the torque arm may be connected to the outboard end of a hollow lug or extension 30 of a cylinder housing 32, the inboard end of which is provided with a similar lug or extension 30, each of the lugs 30 being secured to the frame transom 6 by a bracket 34, mounted on the transom by bolt and nut assemblies 36 and provided with a clamping plate 38 secured thereto as by bolt and nut assemblies 40.

Each lug 30 and connection to the transom may be of the form shown in a copending United States application in the name of Carl E. Tack for Rotor Brake, Serial Number 104,453 and filed July 13, 1949, now Patent No. 2,661,818.

The top of the cylinder housing 32 is provided with an opening 46 normally closed by a cover plate 48 secured to the housing as by screws 50, 50. The cover plate is provided with a nozzle 52 secured thereto as by screws 54 and adapted to afford a convenient fitting for connection to an associated supply or fluid pressure such as a compressed air line (not shown). The plate 48 is also secured by screws 56 to a cylinder unit 58 in the housing and having openings 60 receiving the screws 56.

The housing contains a pair of brake shoe actuating levers 62 and 64, pivoted by pins 66 and 68 to inboard and outboard brake heads 70 and 72, carrying brake shoes 74 and 76 adapted upon actuation of the levers 62 and 64 to frictionally engage opposite sides of the brake disk 14.

Figure 2:
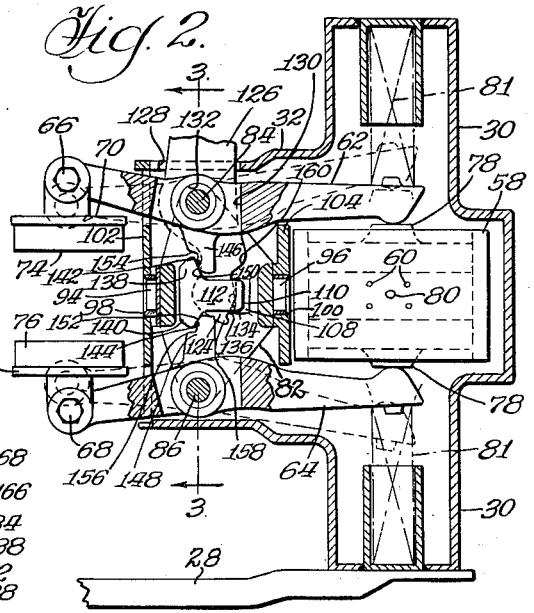
Figure 2 is an enlarged top plan view, partly in central horizontal section of the brake mechanism removed from the truck.
Figure 3:
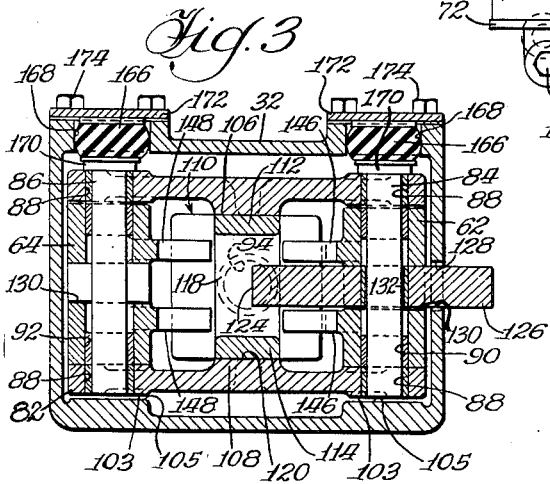
Figure 3 is a sectional view on the line 3—3 of Figure 2.

Referring now to Figures 2 and 3, it will be seen that the cylinder 58 contains spaced pistons 78 engageable with the inner ends of the levers 62 and 64 and comprises an air port 80 adapted to conduct actuating fluid from the nozzle 52 to the cylinder 58 between the pistons 78, as best seen in Figure 2, thereby actuating the levers 62 and 64 under normal conditions. Release of the levers 62 and 64 is effected by springs 81, 81 within the extensions 30.

The brake levers 62 and 64 extend into a hollow fulcrum member 82 and are fulcrumed thereto by pivot pins 84 and 86, respectively, extending through bushed openings 88 in the fulcrum 82 and through bushed openings 90 and 92 in the levers 62 and 64 respectively.

The front and rear extremities of the casting 82 are provided with substantially coaxial trunnions 94 and 96, respectively, as best seen in Figures 2 and 3, said trunnions extending through bushed openings 98 and 100 in the cover plate 102 and wall 104 of the cylinder housing 32, thereby accommodating pivotal movement of the fulcrum casting 82 during relative angling between the wheel and axle assembly 8 and the truck frame 2, as will be apparent to those skilled in the art. Such pivotal movement of the fulcrum member 82 is positively limited by abutment of downwardly facing bosses 103 thereof with aligned bosses 105 of the cylinder housing 32 as best seen in Figure 3.

The top and bottom walls of the fulcrum member 82 are inwardly offset as at 106 and 108, respectively (Figure 3), to define a chamber, receiving an equalizer member or rack 110.

The equalizer rack 110 is a hollow member somewhat rectangular in form in side elevational view and comprises spaced top and bottom walls or straps 112 and 114 interconnected at the head end of the member 110 by a substantially vertical wall 116 and at the tail or butt end of the rack by a substantially vertical wall 118. It will be noted that the top wall 112 is disposed immediately beneath the offset portion 106 of the fulcrum member 82 and that the bottom wall 114 is slidably seated on its bottom side as at 120 on the top side of the offset portion 108.

The straps 112 and 114 and the walls 116 and 118 define a substantially rectangular slot or opening 122 extending through the member 110. The slot receives the inner end or nose 124 of a substantially horizontally disposed hand brake operating lever 126 extending through a complementary slot 128 in the housing 32 and through a slot 130 in the lever 62. The lever 126 has a bushed opening 132 receiving the pin 84 which thus affords pivotal fulcrum for the lever 126 as well as the lever 62. The pin 84 is loosely fitted in the opening 132 to accommodate tilting of the fulcrum 82 on the trunnions 94 and 96. Of course, the opening 132 may be closely fitted around the pin 84 and the lever 126 may move with the fulcrum. It will be noted that the lever 64 is provided with a similar slot 130 so that the levers 62 and 64 are interchangeable. However, it will be understood that the slot 130 in lever 64 may be eliminated if desired.

The outer end of the lever 126 is connected as at 133 to associated hand brake actuating means (not shown) such as are well known in the art.

The wall 116 of the rack member 110 is provided on its inner side with a substantially vertical concave face 134 engageable with a substantially vertical convex face 136 on the rear side of the nose 124. The butt end of the rack member 110 is formed with laterally outwardly extending teeth 138 and 140 which are formed as continuations of the wall 118. The teeth 138 and 140, preferably formed to a standard 14½ or 20 degree involute system, are provided with substantially flat faces 142 and 144 respectively, which diverge toward the butt end of the rack member 110.

Should movement of one brake shoe actuating lever relative to the other take place, the interaction of teeth 138 and 140 with lugs 146 and 148 respectively, and the action of pushing face 136 of hand brake operating lever 126 with wall 116 will result in rotation of rack 110 about a substantially vertical axis. This axis of rotation of the rack is the center of curvature of the seat or face 134 on wall 116 of the rack, and the curvature of the pushing face 136 of the hand brake lever is so selected that, as the hand brake lever is angled in rotation to apply the brake, the lines of tangency between the pushing face and the seat 134 are parallel to the plane of the axes of rotation of the brake levers 62 and 64.

The levers 62 and 64 are provided intermediate their ends at their areas of pivot with inwardly projecting spaced top and bottom lugs 146, 146 and 148, 148 respectively, said lugs extending behind the teeth 138 and 140. The lugs 146 and 148 are provided with convex surfaces 150 and 152 respectively, which are tangential to the surfaces 142 and 144. The curvatures or forms of the surfaces 150 and 152 are so selected that the pressure of the teeth 138 and 140 at surfaces 142 and 144 is at a substantially constant value irrespective of angling of the rack 110. Thus in the preferred embodiment illustrated, the curvatures of surfaces 150 and 152 are such as to correspond with the standard profile of an involute gearing system. The engagement between the lugs 146, 148 and the teeth 138, 140, comprises a standard involute system. A unique property of an involute system is that the moving path of contact between the two forms, sometimes called the line of action, is rectilinear. This line of action also is always tangent to the base circle of a given gear form. In my preferred embodiment, the base circle of the curvatures of the surfaces 150 and 152, respectively, must be struck about the axes of pivot 84 and 86. The axes of pixot being fixed, the base circle and the radii thereof are fixed and equal. The lines of action represent the lines of pressure or force application between the rack 110 and the levers 62 and 64. The radii represent the length of lever distances between the lines of action of the respective pivots and because these radii or lever distances are equal, the pressure of the teeth 138 and 140 on the surfaces 150 and 152 is always equal without regard to the position of the rack.

The butt end of the rack 110 is guided by guides 154 and 156 on the lugs 146 and 148, said guides 154 and 156 being located at the ends of the surfaces 150 and 152 intermediate the ends of the lugs and projecting forwardly of surfaces 150 and 152 around the radial extremities of the teeth 146 and 148 respectively, and being formed as part of the contour of the respective lugs.

The rear side of the lever at its juncture with the nose is curved rearwardly to provide a shoulder 160 to limit angling of the rack 110 toward the lever 62, and the inner end of the lever, or more specifically of the nose, is formed with a rearwardly extending lug or hook 158 which limits angling of the rack 110 toward the lever 64.

Pivotal or tilting movement of the casting 82 on its trunnions 94 and 96 during engagement of the shoes 74 and 76 with the brake disk 14 as the wheel and axle assembly angles vertically with respect to the truck frame 2, is limited as above described by bosses 103 and 105 and is yieldingly resisted by resilient pads 166 mounted within openings 168 of the cylinder housing 32 and compressed against heads 170 of the pins 84 and 86 by spring caps 172 secured to the housing 32 over the openings 168 as by screws 174.

It will be readily appreciated that the arrangement shown and described affords a compact hand brake assembly of rugged construction which will provide equalized braking pressures on both levers irrespective of the condition of wear on either brake shoe.

I claim:

1. In a brake arrangement for a railway car truck, a pair of levers pivoted about vertical axes, a lever arm extending from each lever toward the other, the lever arms being operative for swinging the levers in response to a force applied to the lever arms in direction longitudinally of the levers, a rack between the levers for so applying the force having oppositely projecting teeth and each overlapping an adjacent lever arm, said lever arms having involute gear tooth surfaces and said teeth having gear surfaces engaging the gear tooth surfaces along vertical tangential surfaces, and an actuating lever operatively associated with said rack for moving the same in said direction, said actuating lever and rack having engagement with each other along vertical tangential surfaces, said rack having movement about infinite vertical axes and such movement being limited only by engagement by said surfaces.

2. In a brake arrangement for a railway car truck having a wheel and axle assembly including a rotatable brake surface, the combination of a brake support structure mounted on the truck and including a cylinder housing, a cylinder and piston device in said housing, a pair of levers pivotally fulcrumed to said structure and having their inner ends projecting into the housing and operatively associated with said device, friction means carried by the levers for braking engagement with said surfaces, said levers having pairs of arms respectively on their adjacent sides, said arms being of involute gear form, a rack between said levers, an operating lever projecting between the arms of one pair through said rack, oppositely extending gear teeth on said rack and each overlapping an adjacent pair of arms, opposed bearing surfaces on said teeth and on another portion of said rack, the surfaces on the teeth being substantially flat, the surfaces on the teeth and respective arms engaging each other tangentially, said operating lever and said surface on said other portion engaging each other tangentially.

3. A brake arrangement, according to claim 2, wherein said operating lever comprises a convex face, and said surface on the other portion of the rack is concave.

4. In a brake arrangement for a railway car truck, having a wheel and axle assembly and a friction member rotatable therewith, pivoted levers with stators at opposite sides of the member, said levers having pinion elements of gear tooth form extending angularly to the axis of pivot of said levers, a rack having gear teeth in gear system association with said pinion elements, and an operating lever having tangential engagement with the rack to move the same in a predetermined direction to transmit the operating force through the pinion elements to said levers to effect mutually contrarotational movement of the levers in directions applying the stators against said friction member, said rack being self-adjustable about axes parallel with the pivot axes of said levers in response to forces applied at the engaged elements thereof.

5. An equalizing rack for use in an assembly of the type described comprising a member having an opening therethrough, a curved bearing surface at one end of said opening and gear teeth adjacent to the opposite end of the opening and projecting outwardly from opposite sides of the rack.

6. In a hand brake assembly, a pair of brake levers, a rack therebetween, force transmitting arms arranged in gear tooth form on said levers extending toward each other, teeth on the rack engaged behind said arms, said arms and teeth engaging along tangential areas so selected as to provide substantially the same pressures against the arms irrespective of angling of linear movement of said rack in the plane of said levers, a concave bearing surface on the rack facing toward said teeth, and operating means for actuating the rack comprising a convex bearing surface having tangential engagement with said concave surface, said levers having predetermined points of pivot, the areas of engagement between said concave and convex surfaces being so selected that said areas lie in planes substantially parallel to the plane of the axes of pivot of said levers irrespectively of the angling of said rack.

7. In a hand brake equalizing arrangement of the type described, fixedly pivoted actuating levers, arms on said actuating levers having surfaces thereon of involute gear form, a rack disposed between said levers, other surfaces on the rack, said other surfaces being of involute gear form and tangentially engaging the first mentioned surfaces, and a fixedly pivoted operating lever tangentially engaging said rack, the said tangential engagements being in areas parallel with the pivot axes of said actuating levers, said rack being self-adjustable about axes parallel with the pivot axes of said actuating levers whereby to transmit equal pressure from said operating lever to said actuating levers to cause the latter to move pivotally in mutually opposite directions about their respective pivot axes.

References Cited in the file of this patent

UNITED STATES PATENTS

| | | |
|---|---|---|
| 2,436,136 | Baselt | Feb. 17, 1948 |
| 2,469,564 | Leake | May 10, 1949 |
| 2,497,283 | Wharam et al. | Feb. 14, 1950 |
| 2,498,625 | Tack | Feb. 21, 1950 |

OTHER REFERENCES

"Elements of Mechanism" (Schwamb et al.), pub. by Wiley (N. Y.), 3rd ed., 1921, page 116.